United States Patent
Yao (10) Patent No.: US 12,197,786 B2
(45) Date of Patent: Jan. 14, 2025

(54) METHOD AND NON-TRANSITORY COMPUTER-READABLE STORAGE MEDIUM AND APPARATUS FOR SCHEDULING AND EXECUTING HOST DATA-UPDATE COMMANDS

(71) Applicant: Silicon Motion, Inc., Zhubei (TW)

(72) Inventor: Yu-Hsien Yao, Zhubei (TW)

(73) Assignee: SILICON MOTION, INC., Zhubei (TW)

( * ) Notice: Subject to any disclaimer, the term of this patent is extended or adjusted under 35 U.S.C. 154(b) by 33 days.

(21) Appl. No.: 18/230,364

(22) Filed: Aug. 4, 2023

(65) Prior Publication Data
US 2024/0118832 A1    Apr. 11, 2024

(30) Foreign Application Priority Data
Oct. 11, 2022   (CN) .......................... 202211239102.X (51) Int. Cl.
*G06F 3/06* (2006.01)

(52) U.S. Cl.
CPC .......... *G06F 3/0659* (2013.01); *G06F 3/0607* (2013.01); *G06F 3/0679* (2013.01)

(58) Field of Classification Search
CPC .... G06F 3/0659; G06F 3/0607; G06F 3/0679; G06F 3/0619; G06F 3/061; G06F 12/06; G06F 9/4881
See application file for complete search history.

(56) References Cited

U.S. PATENT DOCUMENTS

| | | | |
|---|---|---|---|
| 10,275,181 B2 | 4/2019 | Chiu et al. | |
| 2006/0184720 A1 | 8/2006 | Sinclair et al. | |
| 2013/0297894 A1 | 11/2013 | Cohen et al. | |
| 2018/0341430 A1 | 11/2018 | Chiu et al. | |

FOREIGN PATENT DOCUMENTS

| | | |
|---|---|---|
| CN | 108932108 B | 7/2021 |
| TW | 200641602 A | 12/2006 |
| TW | I584125 B | 5/2017 |
| TW | I656445 B | 4/2019 |

*Primary Examiner* — Nanci N Wong
(74) *Attorney, Agent, or Firm* — Birch, Stewart, Kolasch & Birch, LLP (57) ABSTRACT

The invention introduces a method for scheduling and executing host data-update commands. A first queue and a second queue are provided. The first queue includes first host data-update commands each including a first logical address. The second queue includes second host data-update commands each including a second logical address. A third host data-update command including a third logical address is generated and is labeled as a first type of host data-update command according to a host command received from a host side. All the first host data-update commands of the first queue are popped out and executed in response that the third logical address is the same as any first logical address. All the second host data-update commands of the second queue are popped out and executed in response that the third logical address is the same as any second logical address.

20 Claims, 5 Drawing Sheets

METHOD AND NON-TRANSITORY COMPUTER-READABLE STORAGE MEDIUM AND APPARATUS FOR SCHEDULING AND EXECUTING HOST DATA-UPDATE COMMANDS

CROSS-REFERENCE TO RELATED APPLICATIONS

This application claims the benefit of priority to Patent Application No. 202211239102.X, filed in China on Oct. 11, 2022; the entirety of which is incorporated herein by reference for all purposes.

BACKGROUND

The disclosure generally relates to storage devices and, more particularly, to a method, a non-transitory computer-readable storage medium and an apparatus for scheduling and executing host data-update commands.

Flash memory devices typically include NOR flash devices and NAND flash devices. NOR flash devices are random access—a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. However, in order to improve the data update performance of flash modules, the execution order of host data-update commands may not match the order of corresponding host commands issued by the host side, thus dirty writes may occur. It is desirable to have a method, a non-transitory computer-readable storage medium and an apparatus for scheduling and executing host data-update commands to avoid errors resulting from the dirty write.

SUMMARY

In an aspect of the invention, an embodiment introduces a method for scheduling and executing host data-update commands, performed by a processing unit, to include the following steps: A first queue and a second queue are provided. The first queue includes first host data-update commands each including a first logical address. The second queue includes second host data-update commands each including a second logical address. A third host data-update command including a third logical address is generated and is labeled as a first type of host data-update command according to a host command received from a host side. All the first host data-update commands of the first queue are popped out and executed in response that the third logical address is the same as any first logical address. All the second host data-update commands of the second queue are popped out and executed in response that the third logical address is the same as any second logical address. The third host data-update command is pushed into the first queue.

In another aspect of the invention, an embodiment introduces a non-transitory computer-readable storage medium having stored therein program code that, when loaded and executed by a processing unit, causes the processing unit to perform the method for scheduling and executing host data-update commands as described above.

In still another aspect of the invention, an embodiment introduces an apparatus for scheduling and executing host data-update commands, to include: a random access memory (RAM); and a processing unit coupled to the RAM. The RAM is arranged operably to allocate space for a first queue and a second queue. The first queue includes first host data-update commands each including a first logical address. The second queue includes second host data-update commands each including a second logical address. The processing unit is arranged operably to: generate a third host data-update command including a third logical address according to a host command received from a host side, and label the third host data-update command as the first type of host data-update command; pop out all the first host data-update commands of the first queue and execute all the first host data-update commands in response that the third logical address is the same as the first logical address of any first host data-update command; pop out all the second host data-update commands of the second queue and execute all the second host data-update commands in response that the third logical address is the same as the second logical address of any second host data-update command; and push the third host data-update command into the first queue.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
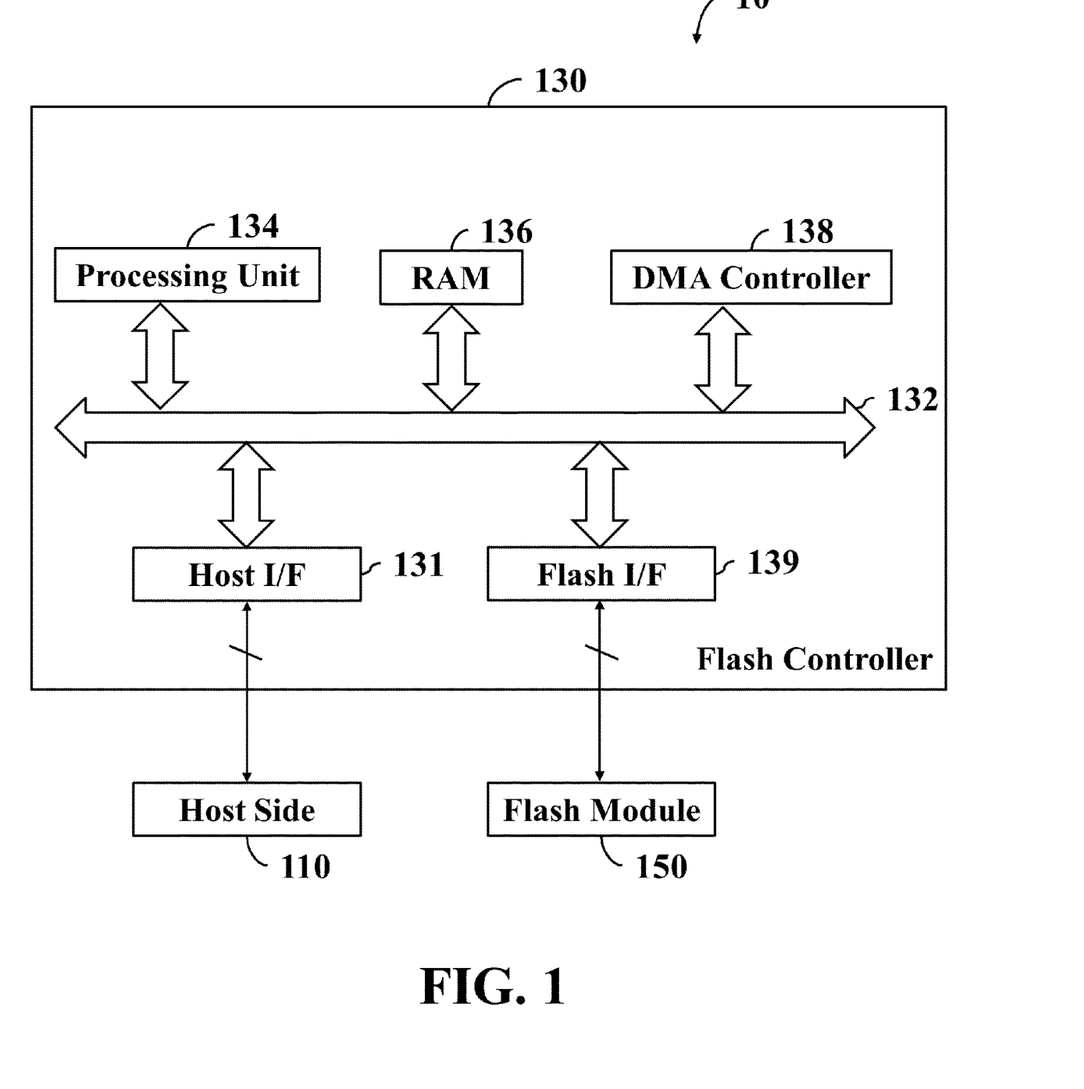
FIG. 1 is the system architecture of an electronic apparatus according to an embodiment of the invention.

Refer to FIG. 1. The electronic apparatus 100 includes the host side 110, the flash controller 130 and the flash module 150, and the flash controller 130 and the flash module 150 may be collectively referred to as a device side. The electronic apparatus 100 may be equipped with a Personal Computer (PC), a laptop PC, a tablet PC, a mobile phone, a digital camera, a digital recorder, a smart television, a smart freezer or other consumer electronic products. The host side 110 and the host interface (I/F) 137 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Non-Volatile Memory Express (NVMe), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g, a single processor, multiple processors or graphics processing units capable of parallel computations, or others) that is programmed using firmware and/or software instructions to perform the functions recited herein. The processing unit 134 may receive host commands from the host side 110 through the host I/F 131, such as write commands, discard commands, erase commands, etc., generate host data-update commands according to the types of the host commands and the parameters carried in the host commands, schedule and execute the host data-update commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, host-to-flash (H2F) tables, flash-to-host (F2H) tables, or others. The flash I/F 139 includes a NAND flash controller (NFC) to provide functions that are required to access to the flash module 150, such as a command sequencer, a Low Density Parity Check (LDDC) encoder/decoder, etc.

The flash controller 130 may be equipped with the bus architecture 132 to couple components to each other to transmit data, addresses, control signals, etc. The components include but not limited to the host I/F 131, the processing unit 134, the RAM 136, the direct memory access (DMA) controller 138 and the flash I/F 139. The DMA controller 138 moves data between the components through the bus architecture 132 according to the instructions issued by the processing unit 134. For example, the DMA controller 138 may migrate data in a specific data buffer of the host I/F 131 or the flash I/F 139 to a specific address of the RAM 136, migrate data in a specific address of the RAM 136 to a specific data buffer of the host I/F 131 or the flash I/F 139, and so on.

The flash module 150 provides huge storage space typically in hundred Gigabytes (GBs), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
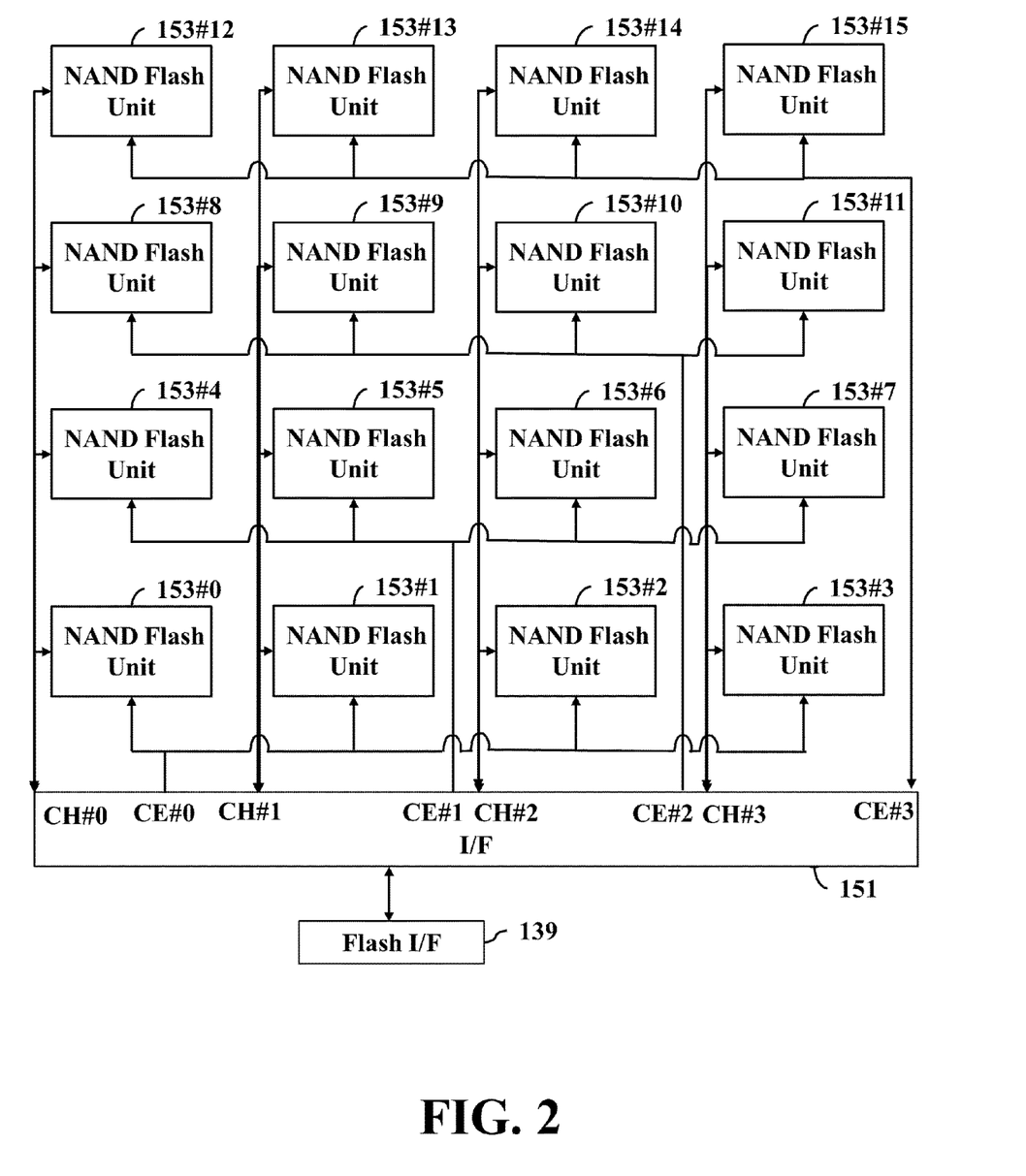
FIG. 2 is a schematic diagram illustrating a flash module according to an embodiment of the invention.

Refer to FIG. 2. The I/F 151 of the flash module 150 may include four I/O channels (hereinafter referred to as channels) CH #0 to CH #3 and each is connected to four NAND flash modules, for example, the channel CH #0 is connected to the NAND flash units 150 #0, 150 #4, 150 #8 and 150 #12. Each NAND flash unit can be packaged in an independent die. The flash I/F 139 may issue one of the CE signals CE #0 to CE #3 through the I/F 151 to activate the NAND flash modules 153 #0 to 153 #3, the NAND flash modules 153 #4 to 153 #7, the NAND flash modules 153 #8 to 153 #11, or the NAND flash modules 153 #12 to 153 #15, and read data from or program data into the activated NAND flash modules in parallel.

To improve the efficiency of data update, the flash controller 130 groups the host commands for updating data into the long-continuous commands and the short-and-scattered commands, separately schedules and executes these two types of commands. The flash controller 130 generates a host data-update command according to the type of each host command and the parameters carried in the host command, where the host data-update command may be expressed as the following data structure: {SN, LA, Len, PA}, SN represents the serial number of the host command, LA represents the start logical address, Len represents the length of logical addresses and PA represents the start physical address. The serial number of the host command indicates the time sequence of the host command arriving at the flash controller 130, and the smaller the number, the earlier the arrival at the flash controller 130. The logical address may be a logical block address (LBA), a host page number, or others. One LBA may point to 512K bytes of data and one host page number may point to eight consecutive LBAs (i.e., 4K bytes) of data. The physical address may include information about a channel number, a logical unit number (LUN), a page number, a section number, or any combinations thereof, which can be interpreted by the flash I/F 139, so that the flash I/F 139 accordingly performs a series of signal interactions with the flash module 150 to complete a specific data programming. When the physical address is all "0" (that is, NULL), it means that the host data-update command is generated according to a host discard command or a host erase command. When the physical address can be interpreted by the flash I/F 139, it means the host data-update command is generated according to a host write command. For example, the host data-update command {1, 100, 16, PA={CH #0, LUN #1, P #0-P #1}} is generated according to the host write command for writing data of LBA #100-LBA #115, in which the physical address is assigned by the flash controller 130 according to the physical arrangements of the flash module 150, and the preset rule. The host data-update command {2, 100, 16, PA=NULL} is generated according to the host discard or erase command for discarding or erasing data of LBA #100-LBA #115.

Figure 3:
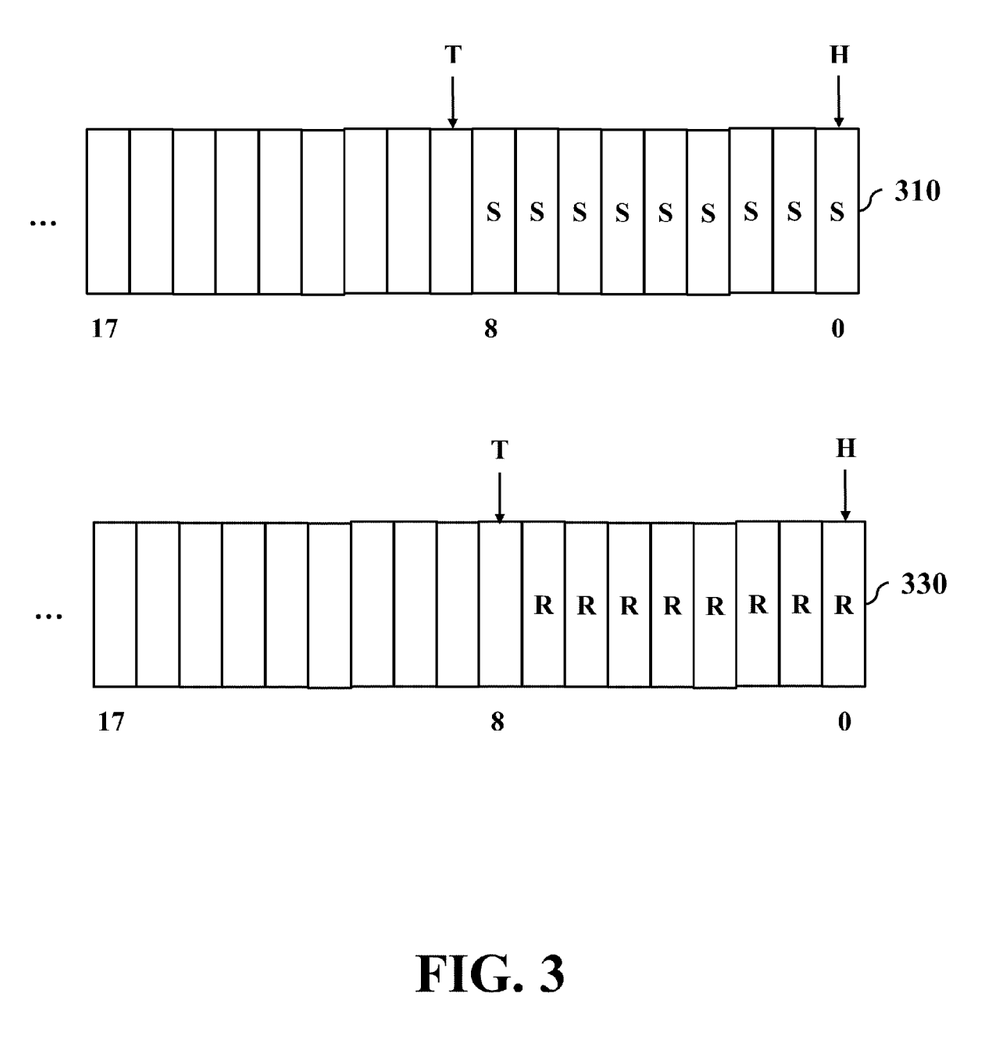
FIG. 3 is a schematic diagram of a random-update command queue and a sequential-update command queue according to an embodiment of the invention.

Refer to FIG. 3. Space is allocated in the RAM 136 for a sequential-update command queue (SCQ) 310, which is used to store sequential host data-update commands sent by the host side 110 according to the time sequence arriving at the flash controller 130. For example, the host data-update command whose LBA length is greater than 1 is the sequential host data-update command. Further space is allocated in the RAM 136 for a random-update command queue (RCQ) 330, which is used to store random host data-update commands sent by the host side 110 according to the time sequence arriving at the flash controller 130. For example, the host data-update command whose LBA length is equal to 1 is the random host data-update command. Any one of the SCQ 310 and the RCQ 330 can store hundreds or thousands of host data-update commands. The SCQ 310 and the RCQ 330 may be implemented by cyclical queues. The principle operations on the SCQ 310 and the RCQ 330 are the addition of entities to the rear terminal position (for example, the position pointed by a pointer "T"), known as enqueue, and removal of entities from the front terminal position (for example, the position pointed by a pointer "H"), known as dequeue. That is, the first command added to the queue will be the first one to be removed, which conforms to the First-In First-Out (FIFO) principle.

For example, the processing unit 134 when executing the program code of the firmware translation layer (FTL) completes the generation and enqueuing of the host data-update commands as described in the following. First, five host write commands: W1={LBA #200-215, D1}; W2={LBA #300, D2}; W3={LBA #400-415, D3}; W4={LBA #300-315, D4}; W5={LBA #200, D5} are sequentially received. The host write command W1 instructs to write the data D1 of logical addresses LBA #200-215, the host write command W2 instructs to write the data D2 of logical addresses LBA #300, the host write command W3 instructs to write the data D3 of logical addresses LBA #400-415, the host write command W4 instructs to write the data D4 of logical addresses LBA #300-315 and the host write command W5 instructs to write the data D5 of logical addresses LBA #200. Subsequently, the host data-update commands: DU1={1, 200, 16, PA #1}; DU2={2, 300, 1, PA #2}; DU3={3, 400, 16, PA #3}; DU4={4, 300, 16, PA #4}; DU5={5, 200, 1, PA #5} are generated for the host write command W1 to W5. After the determinations of the update type, the host data-update commands DU1, DU3 and DU4 (which may be called sequential update commands—SUCs) are pushed into the SCQ 310, and the host data-update commands DU2 and DU5 (which may be called random update commands—RUCs) are pushed into the RCQ 330.

The host data-update commands DU2={2, 300, 1, PA #2} and DU4={4, 300, 16, PA #4} contain the same logical address LBA #300 and DU2 must be executed earlier than DU4. The host data-update commands DU1={1, 200, 16, PA #1} and DU5={5, 200, 1, PA #5} contain the same logical address LBA #200 and DU1 must be executed earlier than DU5.

In some implementations, the flash controller 130 may employ the principle of sequential-update first to remove and process the host data-update commands in the SCQ 310 and the RCQ 330. That is, the flash controller 130 executes the host data-update commands DU1, DU3 and DU4 first, and then executes the host data-update commands DU2 and DU5. However, because DU2 is executed later than DU4, the final update result of the logical address LBA #300 is not the result expected by the host side 110 after the five host data-update commands are executed, and the dirty write occurs.

In alternative implementations, the flash controller 130 may employ the principle of random-update first to remove and process the host data-update commands in the SCQ 310 and the RCQ 330. That is, the flash controller 130 executes the host data-update commands DU2 and DU5 first, and then executes the host data-update commands DU1, DU3 and DU4. However, because DU1 is executed later than DU5, the final update result of the logical address LBA #200 is not the result expected by the host side 110 after the five host data-update commands are executed, and the dirty write occurs.

Figure 4:
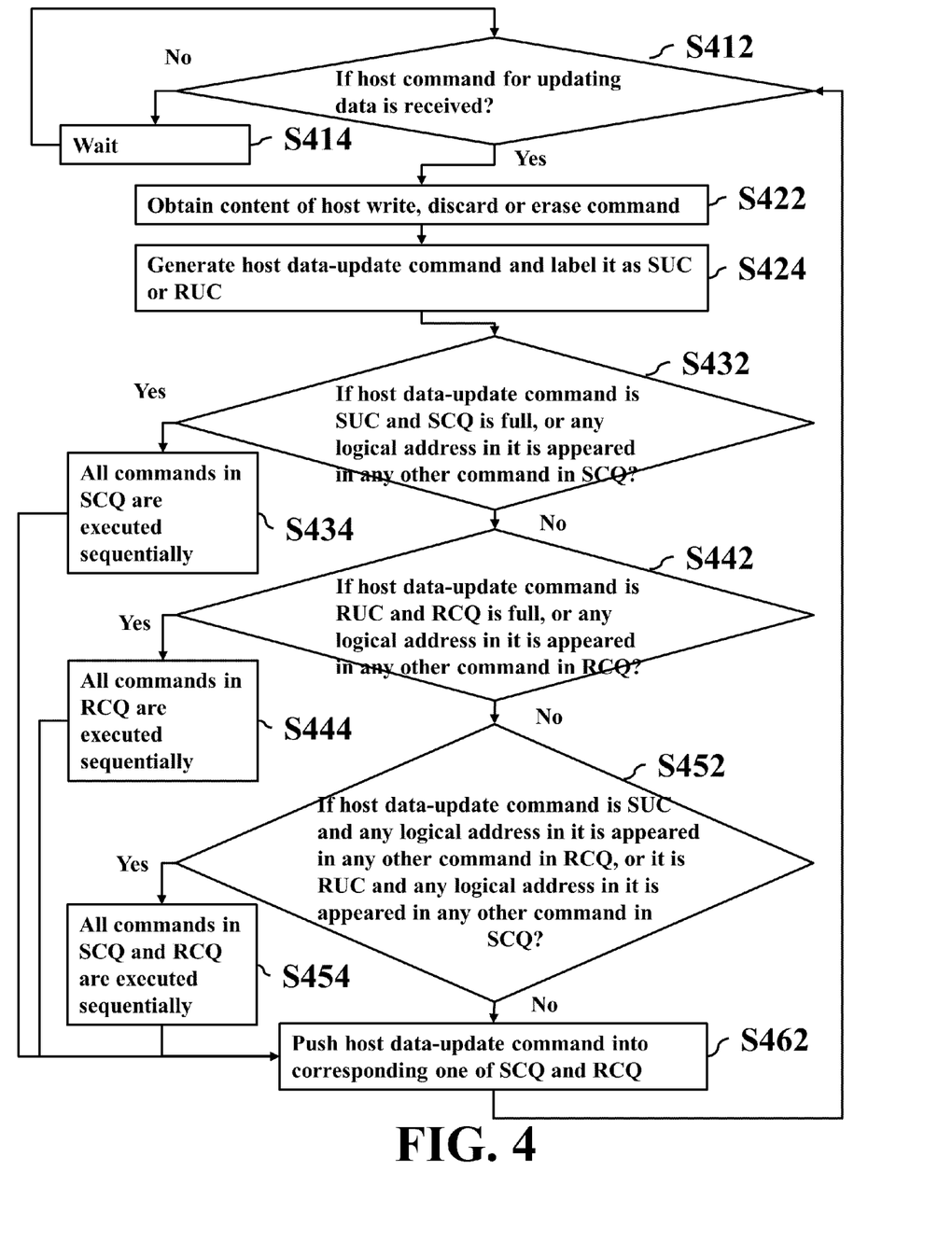
FIG. 4 is a flowchart illustrating a method for scheduling and executing host data-update commands according to an embodiment of the invention.

To address the problems of dirty writes occurred in the implementations as described above, an embodiment of the invention introduces a scheduling mechanism for the host data-update commands. Although the specification describes the shortcomings of the above implementation, this is only used to illustrate the inspiration of embodiments of the present invention as follows. Those artisans can apply the technical solutions to solve other technical problems or be applicable to other technical environments, and the invention should not be limited thereto. With reference made to the flowchart shown in FIG. 4, the method performed by the processing unit 134 when loading and executing the program code of FTL repeatedly receives host commands for updating data from the host side 110, generates the host data-update commands according to the types of the received host commands and the parameters carried in the received host commands, schedules the host data-update commands with the usage of the SCQ 310 and the RCQ 330 and executes the host data-update commands by using the preset rule. The details are as follows:

Step S412: It is determined whether a host command for updating data, such as a host write, discard or erase command, etc., is received from the host side 110 through the host I/F 131. If so, the process proceeds to step S422; otherwise, the process proceeds to step S414.

Step S414: Waits for a predefined time period if there is no host command for updating data to be processed.

Step S422: The content of the host command for updating data is obtained.

Step S424: The host data-update command is generated according to the type of the received host command and the parameters carried in this host command, and the generated host data-update command is labeled as SUC or RUC according to the logical address length carried in this host command. For the data structure and the generation details of the host data-update command, as well as the judgment details for marking the host data-update command as SUC or RUC, the audience may refer to the relevant description in the above paragraphs, and will not be repeated herein for brevity.

Step S432: It is determined whether this host data-update command is SUC and the SCQ 310 is full, or whether any logical address in this host data-update command is appeared in any other host data-update command in the SCQ 310. If so, the process proceeds to step S434; otherwise, the process proceeds to step S442.

Step S434: All SUCs in the SCQ 310 are popped out and executed sequentially. For example, for one or more SUCs for writing data, the processing unit 134 may read to-be-written host data from the buffer in the RAM 136, drive the flash I/F 139 to program the host data into the designated physical address(es) of the flash module 150, and subsequently, update relevant record(s) in the F2H table and/or the H2F table to reflect the executed data-write operations. For one or more SUCs for discarding data, the processing unit 134 may delete the records of the designated logical address(es) from the H2F table temporarily stored in the RAM 136. For one or more SUCs for erasing data, the processing unit 134 may drive the flash I/F 139 to erase designated physical address(es) of the flash module 150, and subsequently, update relevant record(s) in the H2F table to reflect the executed data-erasure operations. Step S434 would ensure that the execution of each SUC with all or partially redundant logical address(es) in the SCQ 310 is earlier than the execution of this host data-update command.

Step S442: It is determined whether this host data-update command is RUC and the RCQ 330 is full, or whether any logical address in this host data-update command is appeared in any other host data-update command in the RCQ 330. If so, the process proceeds to step S444; otherwise, the process proceeds to step S452.

Step S444: All RUCs in the RCQ 330 are popped out and executed sequentially. For example, for one or more RUCs for writing data, the processing unit 134 may read to-be-written host data from the buffer in the RAM 136, drive the flash I/F 139 to program the host data into the designated physical address(es) of the flash module 150, and subsequently, update relevant record(s) in the F2H table and/or the H2F table to reflect the executed data-write operations. For one or more RUCs for discarding data, the processing unit 134 may delete the records of the designated logical address(es) from the H2F table temporarily stored in the RAM 136. For one or more RUCs for erasing data, the processing unit 134 may drive the flash I/F 139 to erase designated physical address(es) of the flash module 150, and subsequently, update relevant record(s) in the H2F table to reflect the executed data-erasure operations. Step S444 would ensure that the execution of each RUC with all or partially redundant logical address(es) in the RCQ 330 is earlier than the execution of this host data-update command.

Step S452: It is determined whether this host data-update command is SUC and any logical address in this host data-update command is appeared in any other host data-update command in the RCQ 330, or whether this host data-update command is RUC and any logical address in this host data-update command is appeared in any other host data-update command in the SCQ 310. If so, the process proceeds to step S454; otherwise, the process proceeds to step S462.

Step S454: All SUCs in the SCQ 310 and all RUCs in the RCQ 330 are popped out and executed sequentially. For the technical details of executing SUC and RUC, reference may be made to the description of steps S434 and S444, which will not be repeated for brevity. Step S454 would ensure that the execution of each SUC or RUC with all or partially redundant logical address(es) in the SCQ 310 or the RCQ 330 is earlier than the execution of this host data-update command.

Step S462: This host data-update command is pushed into the corresponding one of the SCQ 310 and the RCQ 330. If this host data-update command is SUC, then it is pushed into the SCQ 310. If this host data-update command is RUC, then it is pushed into the RCQ 330.

Examples are given below to illustrate the execution of the method in FIG. 4. Initially, SCQ 310 and the RCQ 330 are empty queues.

The processing unit 134 receives the host write command W1={LBA #200-215, D1} at the time point t1 (step S422), generates the host data-update command DU1={1, 200, 16, PA #1} and labels it as SUC according to the content of host write command W1 (step S424). Because the three judgments do not match, the host data-update command DU1={1, 200, 16, PA #1} is pushed into the SCQ 310, at this time the SCQ 310 contains {DU1}, and the RCQ 330 is an empty queue (step S462).

The processing unit 134 receives the host write command W2={LBA #300, D2} at the time point t2 (step S422), generates the host data-update command DU2={2, 300, 1, PA #2} and labels it as RUC according to the content of host write command W2 (step S424). Because the three judgments do not match, the host data-update command DU2={2, 300, 1, PA #2} is pushed into the RCQ 330, at this time the SCQ 310 contains {DU1}, and the RCQ 330 contains {DU2} (step S462).

The processing unit 134 receives the host write command W3={LBA #400-415, D3} at the time point t3 (step S422), generates the host data-update command DU3={3, 400, 16, PA #3} and labels it as SUC according to the content of host write command W3 (step S424). Because the three judgments do not match, the host data-update command DU3={3, 400, 16, PA #3} is pushed into the SCQ 310, at this time the SCQ 310 contains {DU1, DU3}, and the RCQ 330 contains {DU2} (step S462).

The processing unit 134 receives the host write command W4={LBA #300-315, D4} at the time point t4 (step S422), generates the host data-update command DU4={4, 300, 16, PA #4} and labels it as SUC according to the content of host write command W4 (step S424). Since the logical addresses LBA #300-315 are partially redundant with the logical address LBA #300 of the DU2 in the RCQ 330 (the "Yes" path of step S452), the host data-update commands DU1 and DU3 are popped out from the SCQ 310 and executed and the host data-update command DU2 is popped out from the RCQ 330 and executed (step S454). The host data-update command DU4={4, 300, 16, PA #4} is pushed into the SCQ 310, at this time the SCQ 310 contains {DU4}, and the RCQ 330 is an empty queue (step S462).

The processing unit 134 receives the host write command W5={LBA #200, D5} at the time point t5 (step S422), generates the host data-update command DU5={5, 200, 1, PA #5} and labels it as RUC according to the content of host write command W5 (step S424). Because the three judgments do not match, the host data-update command DU5={5, 200, 1, PA #5} is pushed into the RCQ 330, at this time the SCQ 310 contains {DU4}, and the RCQ 330 contains {DU5} (step S462).

Figure 5:
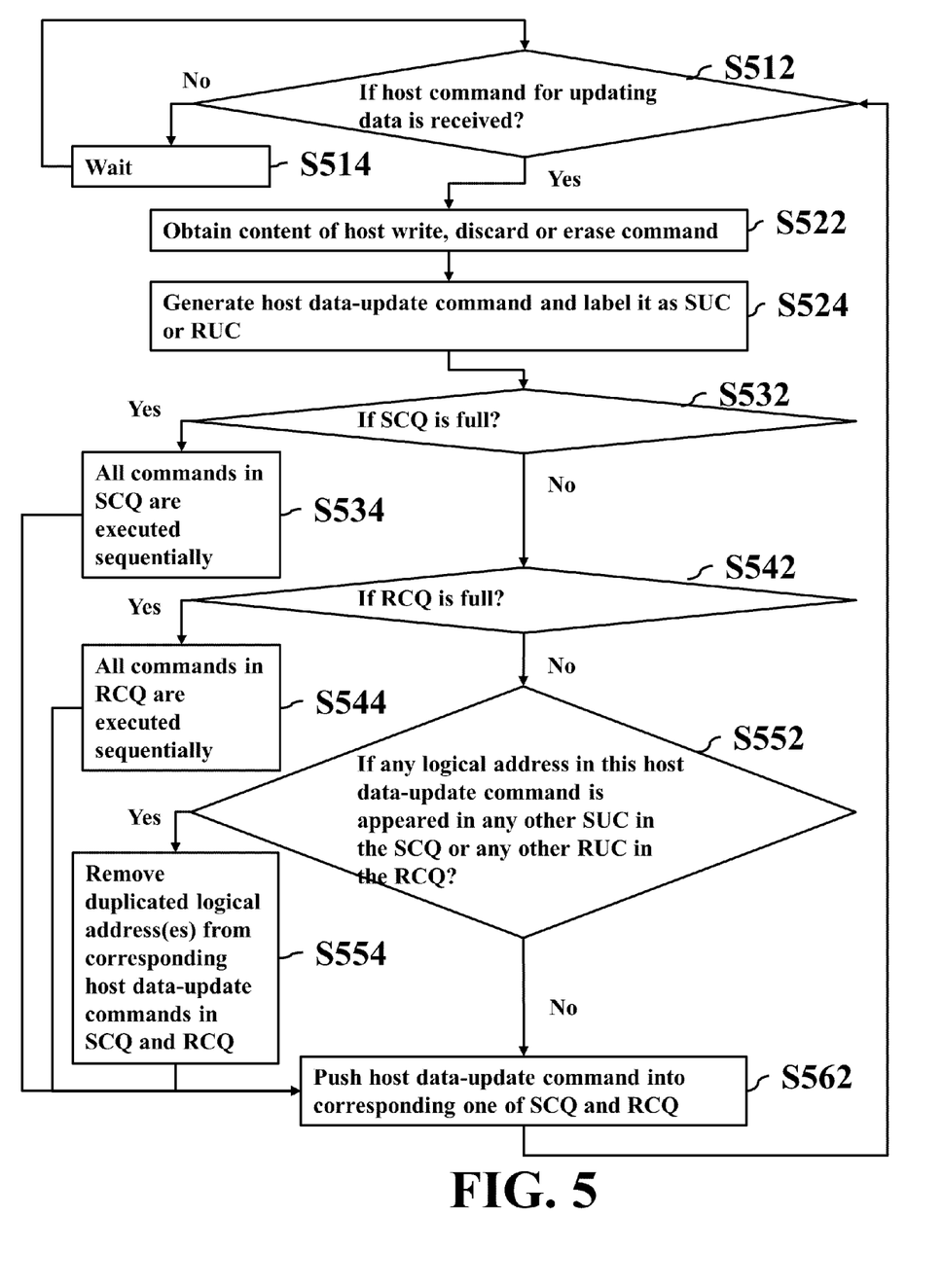
FIG. 5 is a flowchart illustrating a method for scheduling and executing host data-update commands according to an embodiment of the invention.

To address the problems of dirty writes occurred in the implementations as described above, another embodiment of the invention introduces a scheduling mechanism for host data-update commands. Although the specification describes the shortcomings of the above implementation, this is only used to illustrate the inspiration of embodiments of the present invention as follows. Those artisans can apply the technical solutions to solve other technical problems or be applicable to other technical environments, and the invention should not be limited thereto. With reference made to the flowchart shown in FIG. 5, the method performed by the processing unit 134 when loading and executing the program code of FTL repeatedly receives host commands for updating data from the host side 110, generates the host data-update commands according to the types of the received host commands and the parameters carried in the received host commands, schedules the host data-update commands with the usage of the SCQ 310 and the RCQ 330 and executes the host data-update commands by using the preset rule. The details are as follows:

The technical details of steps S512, S514, S522 and S524 are similar to steps S412, S414, S422 and S424 respectively, and for the sake of brevity, the description is not repeated herein.

Step S532: It is determined whether the SCQ 310 is full. If so, the process proceeds to step S534; otherwise, the process proceeds to step S542.

The technical details of step S534 is similar to step S434, and for the sake of brevity, the description is not repeated herein.

Step S542: It is determined whether the RCQ 330 is full. If so, the process proceeds to step S544; otherwise, the process proceeds to step S552.

The technical details of step S544 is similar to step S444, and for the sake of brevity, the description is not repeated herein.

Step S552: It is determined whether any logical address in this host data-update command is appeared in any other SUC in the SCQ 310 or any other RUC in the RCQ 330. If so, the process proceeds to step S554; otherwise, the process proceeds to step S562.

Step S554: The duplicated logical address/addresses is/are removed from the corresponding host data-update command(s) in the SCQ 310 and RCQ 330.

The technical details of step S562 is similar to step S462, and for the sake of brevity, the description is not repeated herein.

Examples are given below to illustrate the execution of the method in FIG. 5. Initially, SCQ 310 and the RCQ 330 are empty queues. The processing unit 134 receives the host write commands W1={LBA #200-215, D1}, W2={LBA #300, D2} and W3={LBA #400-415, D3} at the time points t1, t2 and t3, respectively (step S522), generates the host data-update command DU1={1, 200, 16, PA #1}, DU2={2, 300, 1, PA #2} and DU3={3, 400, 16, PA #3} and labels them as SUC, RUC and SUC according to the content of host write commands W1, W2 and W3, respectively (step S524). Because the host data-update commands DU1, DU2 and DU3 cannot pass the three judgments, the host data-update command DU1 and DU3 are pushed into the SCQ 310, and the host data-update command DU2 is pushed into the RCQ 330 (step S562). After the host write command W3 has been processed, the SCQ 310 contains {DU1, DU3}, and the RCQ 330 contains {DU2}.

The processing unit 134 receives the host write command W4={LBA #300-315, D4} at the time point t4 (step S522), generates the host data-update command DU4={4, 300, 16, PA #4} and labels it as SUC according to the content of host write command W4 (step S524). Since the logical addresses LBA #300-315 are partially redundant with the logical address LBA #300 of the DU2 in the RCQ 330 (the "Yes" path of step S552), the redundant logical address is removed from the host data-update commands DU2 in the RCQ 330, so that the host data-update command DU2={2, 300, 1, PA #2} is updated with DU2'={2, NULL, 0, NULL} (step S554). The host data-update command DU4={4, 300, 16, PA #4} is pushed into the SCQ 310, at this time the SCQ 310 contains {DU1, DU3, DU4}, and the RCQ 330 contains {DU2' } (step S562). It is to be noted that since the logical address of the host data-update command DU2' is NULL, this command will not be executed after it is removed from the RCQ 330 in the future.

The processing unit 134 receives the host write command W5={LBA #200, D5} at the time point t5 (step S522), generates the host data-update command DU5={5, 200, 1, PA #5} and labels it as RUC according to the content of host write command W5 (step S524). Since the logical addresses LBA #200 is partially redundant with the logical address LBA #200-215 of the DU1 in the RCQ 330 (the "Yes" path of step S552), the redundant logical address is removed from the host data-update commands DU1 in the RCQ 310, so that the host data-update command DU1={1, 200, 16, PA #1} is updated with DU1'={1, 201, 15, PA #1' } (step S554). The host data-update command DU5={5, 200, 1, PA #5} is pushed into the RCQ 330, at this time the SCQ 310 contains {DU1', DU3, DU4}, and the RCQ 330 contains {DU2', DU5} (step S562).

The updates on the logical addresses and the enqueuing operations for the host data-update commands are repeatedly performed until the SCQ 310 or the RCQ 330 is full. Once the SCQ 310 is full ("Yes" path of step S532), all host data-update commands in the SCQ 310 are popped out and executed sequentially (step S534). Once the RCQ 330 is full ("Yes" path of step S542), all host data-update commands in the RCQ 330 are popped out and executed sequentially (step S544).

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 and 2, it should be noted that additional elements may be included to achieve better performance without departing from the spirit of the invention. Each element of FIGS. 1 and 2 is composed of various circuits and arranged to operably perform the aforementioned operations. While the process flows described in FIGS. 4 and 5 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for scheduling and executing host data-update commands, performed by a processing unit, comprising:
provide a first queue and a second queue, wherein the first queue comprises a plurality of first host data-update commands, each first host data-update command is a first type of host data-update command and comprises a first logical address, the second queue comprises a plurality of second host data-update commands, each second host data-update command is a second type of host data-update command and comprises a second logical address;
generating a third host data-update command according to a type of a host command received from a host side, and a parameter carried in the host command, and labeling the third host data-update command as the first type of host data-update command, wherein the third host data-update command comprises a third logical address;
popping out all the first host data-update commands of the first queue and executing all the first host data-update commands in response that the third logical address is the same as the first logical address of any first host data-update command;
popping out all the second host data-update commands of the second queue and executing all the second host data-update commands in response that the third logical address is the same as the second logical address of any second host data-update command; and
pushing the third host data-update command into the first queue.

2. The method of claim 1, wherein the first type of host data-update command is a sequential host data-update command and the second type of host data-update command is a random host data-update command.

3. The method of claim 2, wherein a logical block address (LBA) length of the sequential host data-update command is greater than 1 and an LBA length of the random host data-update command is equal to 1.

4. The method of claim 1, wherein the first type of host data-update command is a random host data-update command and the second type of host data-update command is a sequential host data-update command.

5. The method of claim 4, wherein a logical block address (LBA) length of the sequential host data-update command is greater than 1 and an LBA length of the random host data-update command is equal to 1.

6. The method of claim 1, comprising:
popping out all the first host data-update commands of the first queue and executing all the first host data-update commands in response that the first queue is full.

7. The method of claim 6, wherein the first queue is a sequential-update command queue or a random-update command queue.

8. A non-transitory computer-readable storage medium having stored therein program code that, when loaded and executed by a processing unit, causes the processing unit to:
provide a first queue and a second queue, wherein the first queue comprises a plurality of first host data-update commands, each first host data-update command is a first type of host data-update command and comprises a first logical address, the second queue comprises a plurality of second host data-update commands, each second host data-update command is a second type of host data-update command and comprises a second logical address;
generate a third host data-update command according to a type of a host command received from a host side, and a parameter carried in the host command, and label the third host data-update command as the first type of host data-update command, wherein the third host data-update command comprises a third logical address;
pop out all the first host data-update commands of the first queue and execute all the first host data-update commands in response that the third logical address is the same as the first logical address of any first host data-update command;
pop out all the second host data-update commands of the second queue and execute all the second host data-update commands in response that the third logical address is the same as the second logical address of any second host data-update command; and
push the third host data-update command into the first queue.

9. The non-transitory computer-readable storage medium of claim 8, wherein the first type of host data-update command is a sequential host data-update command and the second type of host data-update command is a random host data-update command.

10. The non-transitory computer-readable storage medium of claim 9, wherein a logical block address (LBA) length of the sequential host data-update command is greater than 1 and an LBA length of the random host data-update command is equal to 1.

11. The non-transitory computer-readable storage medium of claim 8, wherein the first type of host data-update command is a random host data-update command and the second type of host data-update command is a sequential host data-update command.

12. The non-transitory computer-readable storage medium of claim 11, wherein a logical block address (LBA) length of the sequential host data-update command is greater than 1 and an LBA length of the random host data-update command is equal to 1.

13. The non-transitory computer-readable storage medium of claim 8, wherein the program code that, when loaded and executed by the processing unit, causes the processing unit to:
pop out all the first host data-update commands of the first queue and execute all the first host data-update commands in response that the first queue is full,
wherein the first queue is a sequential-update command queue or a random-update command queue.

14. An apparatus for scheduling and executing host data-update commands, comprising:
a random access memory (RAM), arranged operably to allocate space for a first queue and a second queue, wherein the first queue comprises a plurality of first host data-update commands, each first host data-update command is a first type of host data-update command and comprises a first logical address, the second queue comprises a plurality of second host data-update commands, each second host data-update command is a second type of host data-update command and comprises a second logical address; and
a processing unit, coupled to the RAM, arranged operably to: generate a third host data-update command according to a type of a host command received from a host side, and a parameter carried in the host command, and label the third host data-update command as the first type of host data-update command, wherein the third host data-update command comprises a third logical address; pop out all the first host data-update commands of the first queue and execute all the first host data-update commands in response that the third logical address is the same as the first logical address of any first host data-update command; pop out all the second host data-update commands of the second queue and execute all the second host data-update commands in response that the third logical address is the same as the second logical address of any second host data-update command; and push the third host data-update command into the first queue.

15. The apparatus of claim 14, wherein the first type of host data-update command is a sequential host data-update command and the second type of host data-update command is a random host data-update command.

16. The apparatus of claim 15, wherein a logical block address (LBA) length of the sequential host data-update command is greater than 1 and an LBA length of the random host data-update command is equal to 1.

17. The apparatus of claim 14, wherein the first type of host data-update command is a random host data-update command and the second type of host data-update command is a sequential host data-update command.

18. The apparatus of claim 17, wherein a logical block address (LBA) length of the sequential host data-update command is greater than 1 and an LBA length of the random host data-update command is equal to 1.

19. The apparatus of claim 14, wherein the processing unit is arranged operably to pop out all the first host data-update commands of the first queue and execute all the first host data-update commands in response that the first queue is full.

20. The apparatus of claim 19, wherein the first queue is a sequential-update command queue or a random-update command queue.

* * * * *